United States Patent
Zaifman et al.

(10) Patent No.: US 10,681,189 B2
(45) Date of Patent: Jun. 9, 2020

(54) TERABIT-SCALE NETWORK PACKET PROCESSING VIA FLOW-LEVEL PARALLELIZATION

(71) Applicant: AT&T Intellectual Property I, L.P., Atlanta, GA (US)

(72) Inventors: Arthur L. Zaifman, Millburn, NJ (US); John M. Mocenigo, Califon, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 261 days.

(21) Appl. No.: 15/598,673

(22) Filed: May 18, 2017

(65) Prior Publication Data

US 2018/0336071 A1 Nov. 22, 2018

(51) Int. Cl.
*H04L 29/06* (2006.01)
*H04L 12/861* (2013.01)
*H04L 12/851* (2013.01)

(52) U.S. Cl.
CPC .......... *H04L 69/22* (2013.01); *H04L 47/2408* (2013.01); *H04L 49/9063* (2013.01); *H04L 47/24* (2013.01); *H04L 49/9068* (2013.01)

(58) Field of Classification Search
CPC . H04L 69/22; H04L 47/2408; H04L 49/9063; H04L 49/9068; H04L 49/9078; H04L 47/24; H04L 47/2483
See application file for complete search history.

(56) References Cited

U.S. PATENT DOCUMENTS

| | | | |
|---|---|---|---|
| 6,338,078 B1 | 1/2002 | Chang et al. | |
| 6,631,422 B1 | 10/2003 | Althaus et al. | |
| 6,754,662 B1* | 6/2004 | Li | H04L 45/00 707/693 |
| 6,870,849 B1 | 3/2005 | Callon et al. | |
| 7,206,861 B1 | 4/2007 | Callon | |
| 7,483,430 B1 | 1/2009 | Yuan et al. | |
| 7,633,871 B1 | 12/2009 | Callon | |
| 7,813,342 B2* | 10/2010 | Gadelrab | H04L 49/9063 370/389 |

(Continued)

FOREIGN PATENT DOCUMENTS

| | | |
|---|---|---|
| CA | 2577891 A1 | 3/2006 |
| WO | WO 00/52883 A2 * | 9/2000 ......... H04L 49/9063 |

OTHER PUBLICATIONS

Junchang Wang et al., "Practice of parallelizing network applications on multi-core architectures." Proceedings of the 23rd international conference on Supercomputing. ACM, Jun. 8, 2009. 10 Pages. http://ai2-s2-pdfs.s3.amazonaws.com/8685/59c1794ea6f0d9a6ab0383c69e3b3f04acad.pdf.

(Continued)

Primary Examiner — Patrice L Winder (57) ABSTRACT

In one example, the present disclosure describes a device, computer-readable medium, and method for organizing terabit-scale packet volumes into flows for downstream processing stages. For instance, in one example, a method includes extracting a first flow key from a first data packet, inputting the first flow key into a hash function to obtain a first output value, selecting a first partition in a memory to which to store the first data packet, wherein the first partition is selected based on the first output value, and storing the first data packet to the first partition.

20 Claims, 4 Drawing Sheets

(56) References Cited

U.S. PATENT DOCUMENTS

| | | | |
|---|---|---|---|
| 7,836,195 B2* | 11/2010 | Veal | H04L 43/026 370/412 |
| 8,004,990 B1 | 8/2011 | Callon | |
| 8,018,961 B2 | 9/2011 | Gopinath et al. | |
| 8,131,841 B2 | 3/2012 | Eswaran et al. | |
| 8,259,585 B1 | 9/2012 | S P et al. | |
| 8,503,456 B2 | 8/2013 | Matthews et al. | |
| 8,788,570 B2 | 7/2014 | Goel | |
| 8,990,431 B2 | 3/2015 | Goel et al. | |
| 9,172,756 B2 | 10/2015 | Ramachandran et al. | |
| 9,397,946 B1* | 7/2016 | Yadav | H04L 41/0806 |
| 9,450,780 B2* | 9/2016 | Wang | H04L 45/38 |
| 9,838,291 B2* | 12/2017 | Bukin | H04L 43/12 |
| 9,853,903 B1* | 12/2017 | Sharma | H04L 47/21 |
| 9,860,332 B2* | 1/2018 | Kuang | H04L 67/2842 |
| 9,948,559 B2* | 4/2018 | Wang | H04L 45/7453 |
| 10,230,824 B2* | 3/2019 | Bergeron | H04L 69/22 |
| 2006/0251108 A1 | 11/2006 | Hendel et al. | |
| 2008/0101233 A1 | 5/2008 | Shi et al. | |
| 2009/0217369 A1 | 8/2009 | Abeni et al. | |
| 2013/0343377 A1 | 12/2013 | Stroud et al. | |
| 2014/0282551 A1* | 9/2014 | Arramreddy | H04L 69/321 718/100 |
| 2015/0078375 A1* | 3/2015 | Hendel | H04L 45/7453 370/389 |
| 2016/0191530 A1 | 6/2016 | Jain et al. | |
| 2017/0318082 A1* | 11/2017 | Thakur | H04L 45/16 |

OTHER PUBLICATIONS

Wang Cong et al., "High performance deep packet inspection on multi-core platform." Broadband Network & Multimedia Technology, 2009. IC-BNMT'09. 2nd IEEE International Conference. IEEE, Oct. 18, 2009. pp. 619-622. http://doras.dcu.ie/15525/1/wang2.pdf.

Adam Kirsch et al., "Hash-based techniques for high-speed packet processing." Algorithms for Next Generation Networks. Springer London, Jan. 20, 2010. pp. 181-218. https://pdfs.semanticscholar.org/765a/79c9c0b25b0b89d06491825ec3a7b8342a8c.pdf.

Bo Xu et al., "Scalable string matching framework enhanced by pattern clustering." Ubiquitous Computing and Communication Journal vol. 5, No. 2 (Jun. 15, 2010): pp. 16-26. https://pdfs.semanticscholar.org/9ada/7330b0a32f326daec49a50dc502c081612bc.pdf.

Terry Nelms et al., "Packet scheduling for deep packet inspection on multi-core architectures." Architectures for Networking and Communications Systems (ANCS), 2010 ACM/IEEE Symposium. IEEE, Oct. 25, 2010. 11 Pages. https://www.researchgate.net/profile/Terry_Nelms/publication/221046070_Packet_scheduling_for_deep_packet_inspection_on_multicore_architectures/links/53fca49a0cf22f21c2f3f276.pdf.

* cited by examiner

TERABIT-SCALE NETWORK PACKET PROCESSING VIA FLOW-LEVEL PARALLELIZATION

The present disclosure relates generally to data mining, and relates more particularly to devices, non-transitory computer-readable media, and methods for organizing packet flows for downstream processing stages.

BACKGROUND

Data mining has become a valuable tool for helping network service providers to analyze and understand their customers' service-related needs. For instance, information can be extracted from a data set (e.g., a set of packets exchanged between network endpoints) and transformed into a structure that can be analyzed for the occurrence of patterns, relationships, and other statistics that indicate how the customers are using the network.

SUMMARY

In one example, the present disclosure describes a device, computer-readable medium, and method for organizing terabit-scale packet volumes into flows for downstream processing stages. For instance, in one example, a method includes extracting a first flow key from a first data packet, inputting the first flow key into a hash function to obtain a first output value, selecting a first partition in a memory to which to store the first data packet, wherein the first partition is selected based on the first output value, and storing the first data packet to the first partition.

In another example, a device includes a processor and a computer-readable medium storing instructions which, when executed by the processor, cause the processor to perform operations. The operations include extracting a first flow key from a first data packet, inputting the first flow key into a hash function to obtain a first output value, selecting a first partition in a memory to which to store the first data packet, wherein the first partition is selected based on the first output value, and storing the first data packet to the first partition.

In another example, an apparatus includes a first network interface card and a second network interface card. The first network interface card is configured to identify, by applying a first hash function to a first flow key extracted from a first data packet, a first flow of packets of a plurality of flows of packets to which the first data packet belongs. The second network interface card is configured to identify, by applying the first hash function to a second flow key extracted from a second data packet, a second flow of packets of the plurality of flows of packets to which the second data packet belongs. The apparatus also includes a memory, wherein a first partition of the memory is assigned to the first flow of packets and a second partition of the memory is assigned to the second flow of packets. The apparatus also includes a plurality of processors configured to execute a plurality of threads including a first thread and a second thread, wherein the first thread is programmed to retrieve data packets from the first partition and the second thread is programmed to retrieve data packets from the second partition.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure organizes terabit-scale packet volumes into flows for downstream processing stages. As discussed above, data mining has become a valuable tool for helping network service providers to analyze and understand their customers' service-related needs. Network traffic can be analyzed for patterns, relationships, and other statistics that indicate how the customers are using the network. However, as traffic volumes increase (e.g., to the terabit scale), and real-time analysis applications are moved to the cloud, these applications must adapt to the highly distributed environment and the increasing volume of traffic. Parallelization (e.g., processing of multiple data items simultaneously, or in parallel) can greatly speed the processing of large volumes of data. However, when working with terabit-rate packet volumes, parallelization at the packet level is infeasible. For instance, the number of incoming packets could vastly overwhelm the number of threads available to process the packets.

Examples of the present disclosure provide a way of organizing terabit-rate packet volumes into flows for downstream processing stages that may be performed in parallel. Although parallelization at the packet level has been shown to be infeasible at terabit rates, by efficiently organizing the packets into packet flows, examples of the present disclosure are able to achieve terabit-rate parallelization at the flow-level. In one example, packet traffic traversing the network is replicated, and the replicated or "mirrored" versions of the original packets (hereinafter referred to simply as "packets") are subsequently organized into flows, which are in turn uniquely assigned to respective processing threads of a host computing system (e.g., an application server). In some examples, the header of a packet is scanned by an intelligent (i.e., programmable) network interface card (NIC) for a flow key, which is input into a hash function. The result of the hash function operating on the flow key is a value that corresponds to a thread identifier, where the thread identified by the thread identifier is assigned to process the flow of packets to which the packet belongs. The packet is then stored by the NIC in a partition in memory that is accessible by the corresponding thread.

Figure 1:
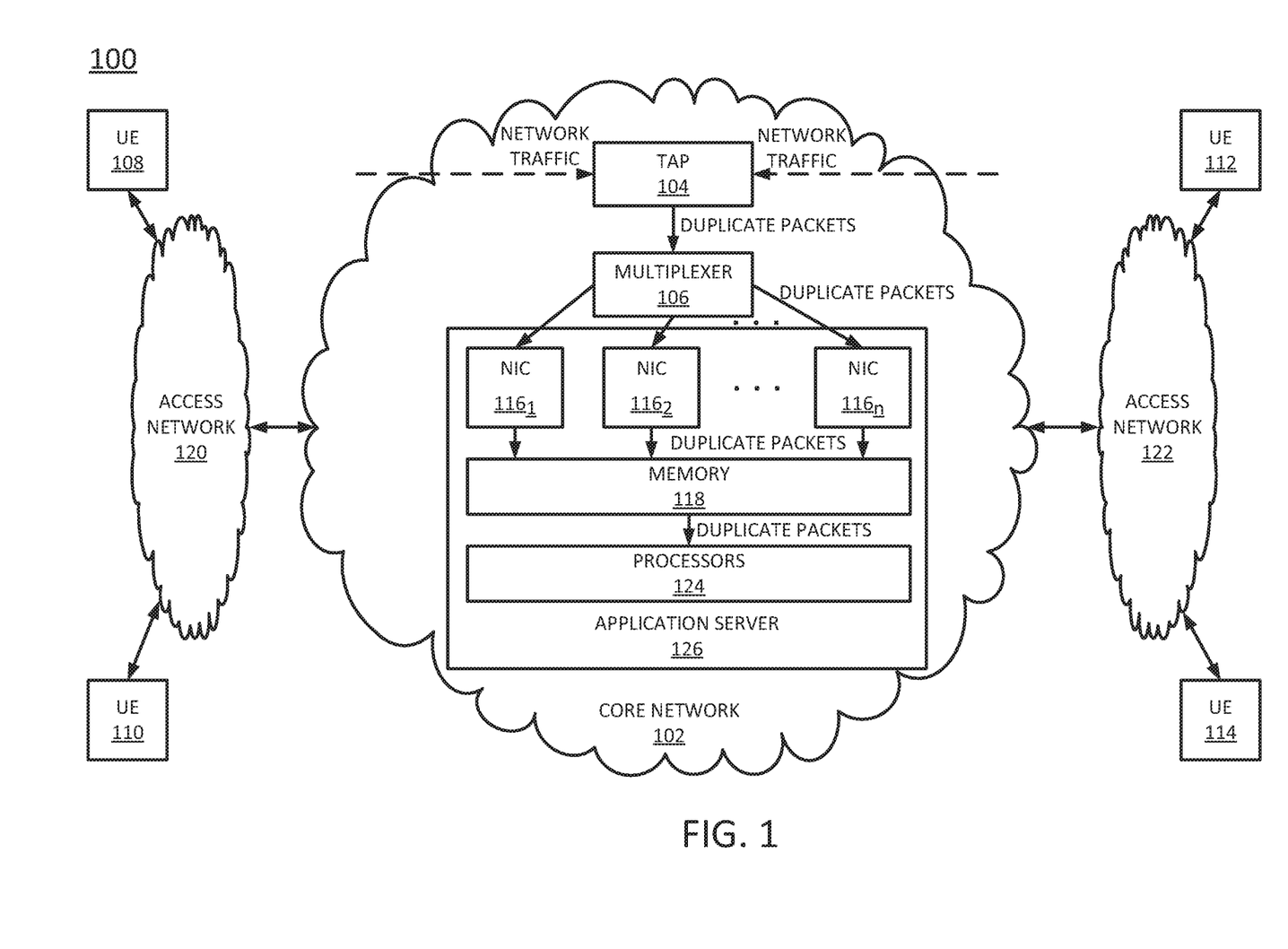
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include a traffic analysis point (TAP) 104, a multiplexer 106, and an application server 126. Although only a single TAP 104, a single multiplexer 106, and a single application server 126 are illustrated, it should be noted that any number of TAPs, multiplexers, and application servers may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114. Access networks 120 and 122 may transmit and receive communications between respective UEs 108, 110, 112, and 114 and core network 102 relating to communications with web servers, TAP 104, and/or other servers via the Internet and/or other networks, and so forth.

In one embodiment, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed.

In one embodiment, the TAP 104 is configured to mirror or replicate data packets traversing the core network 102 and to send the replicated data packets (hereinafter referred to as "packets" or "data packets") to the multiplexer 106. In one example, the TAP 104 is an optical TAP that mirrors the data packets in a manner that is transparent to the UEs 108, 110, 112, and 114 (i.e., without noticeably disrupting the network activity).

The multiplexer 106 executes a load balancing algorithm in order to distribute the data packets among n intelligent network interface cards $116_1$-$116_n$ (hereinafter collectively referred to as "NICs 116") of the application server 126. For instance, the data packets may be distributed to the NICs 116 in a round robin fashion, a weighted round robin fashion, a random fashion, or according to any other load balancing algorithm.

Each of the NICs 116 scans the header of each data packet that it receives and extracts a flow key. Data packets belonging to the same flow of packets will contain the same flow key. For instance, all data packets belonging to a first flow of packets will contain a first flow key, while all data packets belonging to a second flow of packets will contain a second flow key that is different from the first flow key. In one embodiment, the flow key is a 5-tuple defining the Transmission Control Protocol/Internet Protocol (TCP/IP) connection via which the data packet travels. In one example, the 5-tuple includes: the source IP address, the destination IP address, the source port number (e.g., Transmission Control Protocol/User Datagram Protocol or TCP/UDP port number), the destination port number (e.g., TCP/UDP port number), and the type of service (ToS). The NIC 116 then inputs the flow key into a hash function. In one example, each NIC 116 may comprise a processor (e.g., a central processing unit) or a field programmable gate array (FPGA) to run the hash function.

In one example, each of the NICs 116 uses the same hash function to ensure uniform assignment of packet flows to processing threads. The hash function may be deterministic, such that the assignment of a packet to a packet flow, and of a packet flow to a processing thread, is predictable (e.g., not random). For instance, as discussed in greater detail below, the output value of the hash function comprises a thread identifier that corresponds to a specific processing thread executing on one of the processors 124 of the application server 126. Moreover, because data packets belonging to the same flow of packets share the same flow key, and because the same hash function is used by all NICs 116, the output value of the hash function will be the same for all data packets belonging to the same flow of packets, regardless of which NICs 116 receive the data packets. The NICs 116 may tag the data packets with the output value of the hash function before storing the data packets in the memory 118 of the application server 126.

Figure 2:
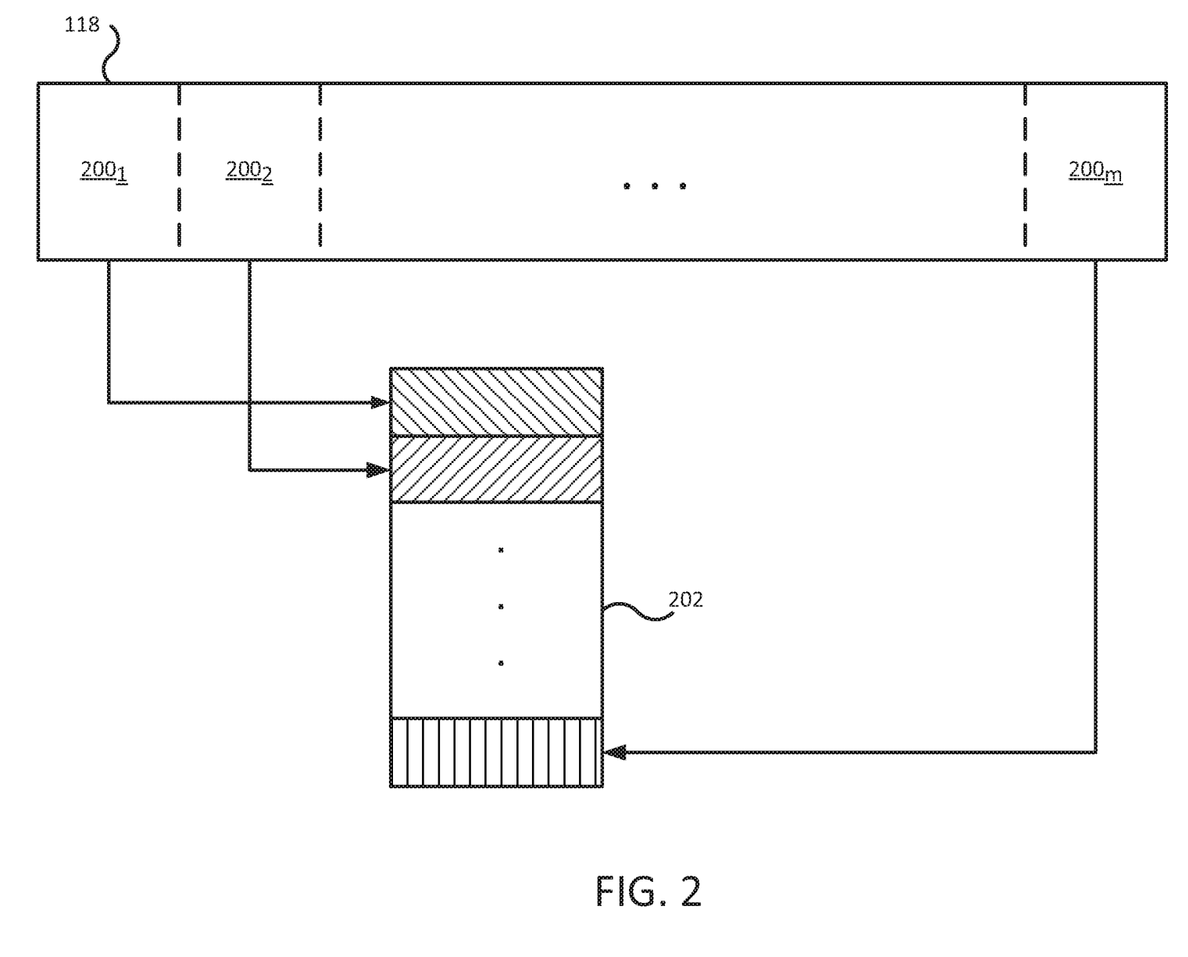
FIG. 2 is a block diagram illustrating one example of the memory of FIG. 1 in more detail.

As discussed above, the application server 126 further comprises a memory 118. FIG. 2 is a block diagram illustrating one example of the memory 118 of FIG. 1 in more detail. As illustrated, the memory 118 is divided into a plurality partitions $200_1$-$200_m$ (hereinafter collectively referred to as "partitions 200"). The partitions 200 may occupy contiguous blocks of the memory 118. The number of and the sizes of the partitions 200 are configurable, and may be reconfigured on-the-fly to accommodate packet flows of varying sizes and changing network conditions. For instance, the number of partitions may be increased when service times decrease and/or when the number of threads executing on the processors 124 increases. The maximum number of partitions 200 may be empirically determined, and in one embodiment the maximum number of partitions 200 does not exceed a value that would cause an imbalance (i.e., a disproportionate share of packet flows being assigned to one partition 200, where "disproportionate" may be defined as some configurable percentage of packet flows beyond the mean or median number of packet flows assigned to all of the partitions 200) across the partitions 200. In one example, packet distribution across the partitions 200 is uniformly random, but may exhibit periods of intense imbalance. In one example, where the number of partitions 200 is x, the packet flow-to-partition assignment is flow modulo x.

In one example, each of the partitions 200 is assigned to one flow of packets. Thus, the NICs 116 select the appropriate partitions 200 to which to store the data packets based on the output values of the hash function. In other words, the output value of the hash function for a particular data packet will determine the partition 200 to which the data packet should be stored. Data packets stored in the partitions 200 may be queued up in a work queue 202 from which threads executing on the processors 124 of the application server 126 retrieve the data packets for processing. Queuing of the data packets may be based on a round robin service model, a pseudo-random service model, or any other service model.

As discussed above, the application server 126 further comprises a plurality of processors 124. Each of the processors 124 further supports a plurality of threads, where each thread of the plurality of threads is assigned to process data packets from a unique flow of packets. As discussed above, each thread is further assigned to one of the partitions 200 in the memory 118 of the application server 126. For instance, a first thread may retrieve data packets from a first partition, while a second thread may retrieve data packets from a second partition. As such, the processors 124 may support parallel processing of a plurality of packet flows, where the individual packets of the packet flows are traversing the network 100 at terabit rates. In one example, one or more of the processors 124 may also host a set of instructions for running the hash function into which the flow keys are input (e.g., as an alternative to the NICs 116 running the hash function).

Thus, when a NIC 116 inputs a flow key from a data packet into the hash function, the output value of the hash function will dictate to which partition 200 in memory 118 the data packet is stored. The partition 200, in turn, will dictate which thread executing on the processors 124 accesses the data packet for further processing. Because the flow key does not change for the life of the flow of packets, and because the same hash function is used by all of the NICs 116, the assignment of a flow of packets to a processing thread persists, without the need for blocking or synchronization. Data packets can thus be efficiently organized into flows of packets, and flows of packets can be uniquely assigned to processing threads. By leveraging the natural organization of data packets in an IP network (i.e., the packet flows) along with the hash function (which minimizes per-packet synchronization costs), examples of the present disclosure are thus able to achieve efficient parallelization in a network where packet volumes approach terabit rates.

It should be noted that although the appropriate partition 200 in memory 118 and the appropriate thread in the processors 124 for a given data packet will be dictated by the same information (i.e., the output value of the hash function), the correspondence between the number of partitions 200 and the number of threads is not necessarily one-to-one. In general, the greater the ratio of partitions 200 to threads, the less likely it will be that two or more threads will collide on (i.e., attempt to concurrently access) the same partition 200. When parallelization is achieved at partition-level granularity as disclosed, collisions are more likely to occur during periods of cross-partition imbalance. An increase in sustained imbalance periods (i.e., durations of time during which imbalances are present) may also cause an increase in the number of partitions 200.

In one example, increasing the number of partitions 200 in the memory 118 may minimize thread collisions. Collisions can be further minimized by ensuring that a partition 200 is not assigned to a new thread until the currently assigned thread has finished operating on its flow of packets. In one example, this is enforced by imposing a "drain period" before increasing the number of partitions from a first number to a second number and redistributing the flows of packets to the second number of partitions. During the drain period, the threads complete processing on the data packets that they have already retrieved from the first number of partitions. Once the last thread finishes processing its data packets, the drain period ends, the second number of partitions is instantiated, and the flows of packets are redistributed to the second number of partitions. Redistribution of the flows of data packets may result in a flow of packets being processed by a new thread; however, by imposing the drain period, the chances of the new thread processing the flow of packets at the same time as the old thread are minimized. Flow-level locking may be imposed to minimize the duration of the drain period. In this case, the flow-level locking takes advantage of the dynamic inherently present in very large networks, where the probability of consecutive data packets belonging to the same flow of data packets at a single observation point (e.g., the TAP 104) is very small.

Figure 4:
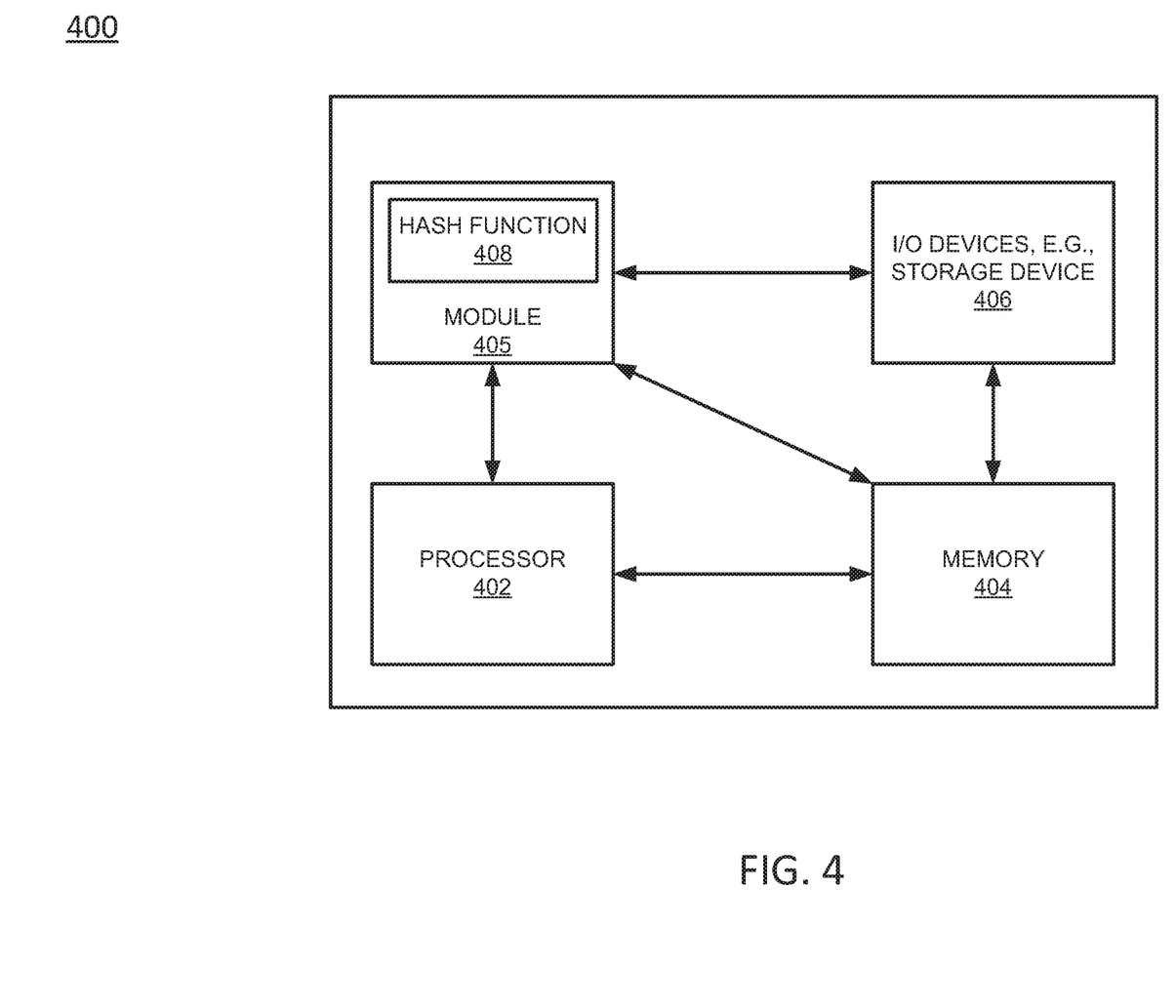
FIG. 4 depicts a high-level block diagram of a computing device specifically programmed to perform the functions described herein.

Any one or more of the TAP 104, multiplexer 106, application server 126, or NICs 116 may comprise or be configured as a general purpose computer as illustrated in FIG. 4 and discussed below. It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 3:
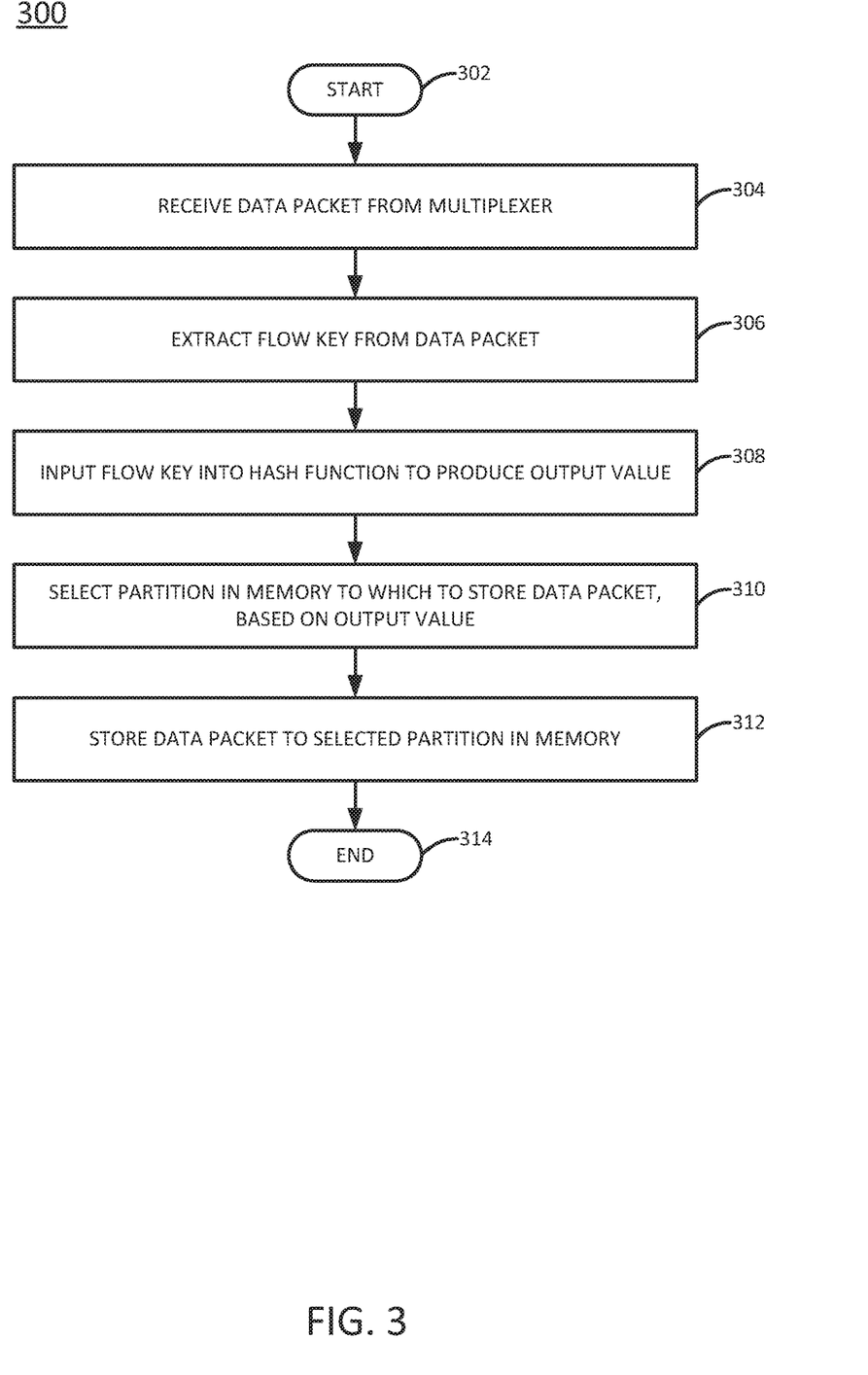
FIG. 3 illustrates a flowchart of an example method for organizing terabit-scale packet volumes into flows for downstream processing stages.

To further aid in understanding the present disclosure, FIG. 3 illustrates a flowchart of an example method 300 for organizing terabit-scale packet volumes into flows for downstream processing stages. In one example, the method 300 may be performed by an intelligent NIC, e.g., one of the NICs 116 illustrated in FIG. 1. However, in other examples, the method 300 may be performed by another device. As such, any references in the discussion of the method 300 to the NICs 116 of FIG. 1 (or any other elements of FIG. 1) are not intended to limit the means by which the method 300 may be performed.

The method 300 begins in step 302. In step 304, the NIC 116 receives a data packet from the multiplexer 106. In one example, the data packet is a replica of a data packet that was exchanged between two endpoints in the network 100 (e.g., between two of the UEs 108, 110, 112, and 114). As discussed above, the data packet may have been directed to the NIC 116 in accordance with any load balancing algorithm.

In step 306, the NIC 116 extracts a flow key from the data packet. In one example, the flow key is extracted from the data packet's header and comprises a 5-tuple of source IP address, destination IP address, source port number, destination port number, and ToS.

In step 308, the NIC 116 inputs the flow key into a hash function. The hash function produces an output value based on the input flow key.

In step 310, the NIC selects a partition 200 in memory 118 to which to store the data packet, based on the output value of the hash function. As discussed above, in one example, the output value of the hash function comprises a thread identifier that dictates both: (1) the corresponding thread executing on the processors 124 that will process the flow of packets to which the data packet belongs; and (2) the partition 200 in memory 118 to which to store the data packets of the flow of packets for retrieval by the thread.

In step 312, the NIC stores the data packet to the partition 200 in memory 118 that was selected in step 310. The method 300 ends in step 314.

Although not expressly specified above, one or more steps of the method 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 300 may be implemented as the system 400. For instance, any one of the NICs 116 of FIG. 1 (such as might be used to perform the method 300) could be implemented as illustrated in FIG. 4. Alternatively, the application server 126 as a whole could be implemented as illustrated in FIG. 4.

As depicted in FIG. 4, the system 400 comprises a hardware processor element 402, a memory 404, a module 405 for organizing terabit-scale packet volumes into flows, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for organizing terabit-scale packet volumes into flows may include circuitry and/or logic for performing special purpose functions relating to data mining, including a code component 408 for executing the hash function described above (where each NIC that is configured as illustrated in FIG. 4 includes the same code component 408 executing the same hash function). The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for organizing terabit-scale packet volumes into flows (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for organizing terabit-scale packet volumes into flows (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
extracting, by a network interface card, a first flow key from a first data packet, wherein the first flow key comprises a 5-tuple extracted from a header of the first data packet, wherein the 5-tuple extracted from the header of the first data packet comprises:
a source internet protocol address of the first data packet;
a destination internet protocol address of the first data packet;
a source port number of the first data packet;
a destination port number of the first data packet; and
a type of service associated with the first data packet;
inputting, by the network interface card, the first flow key into a hash function to obtain a first output value;
selecting, by the network interface card, a first partition in a memory distinct from the network interface card to which to store the first data packet, wherein the first partition is selected based on the first output value; and
storing, by the network interface card, the first data packet to the first partition.

2. The method of claim 1, wherein the first output value comprises a thread identifier that corresponds to a first processing thread executing on a first processor.

3. The method of claim 2, wherein the first processing thread is one of a plurality of processing threads executing in parallel on a plurality of processors including the first processor.

4. The method of claim 3, wherein a total number of partitions in the memory, including the first partition, is greater than a total number of the plurality of processing threads.

5. The method of claim 2, wherein a flow of packets including the first data packet is assigned to the first processing thread.

6. The method of claim 5, wherein the flow of packets comprises a plurality of data packets including the first data packet, and all data packets in the plurality of data packets share a common flow key that is identical to the first flow key.

7. The method of claim 1, further comprising:
extracting a second flow key from a second data packet, wherein the second flow key comprises a 5-tuple extracted from a header of the second data packet, wherein the 5-tuple extracted from the header of the second data packet comprises:
a source internet protocol address of the second data packet;
a destination internet protocol address of the second data packet;
a source port number of the second data packet;
a destination port number of the second data packet; and
a type of service associated with the second data packet;
inputting the second flow key into the hash function to obtain a second output value that is different from the first output value;
selecting a second partition in the memory to which to store the second data packet, wherein the second partition is selected based on the second output value; and
storing the second data packet to the second partition.

8. The method of claim 1, wherein the network interface card is an intelligent network interface card of a host computing system.

9. A device comprising:
a processor; and
a computer-readable medium storing instructions which, when executed by the processor, cause the processor to perform operations, the operations comprising:
extracting a first flow key from a first data packet, wherein the first flow key comprises a 5-tuple extracted from a header of the first data packet, wherein the 5-tuple extracted from the header of the first data packet comprises:
a source internet protocol address of the first data packet;
a destination internet protocol address of the first data packet;
a source port number of the first data packet;
a destination port number of the first data packet; and
a type of service associated with the first data packet;
inputting the first flow key into a hash function to obtain a first output value;
selecting a first partition in a memory distinct from the device to which to store the first data packet, wherein the first partition is selected based on the first output value; and
storing the first data packet to the first partition.

10. The device of claim 9, wherein the first output value comprises a thread identifier that corresponds to a first processing thread executing on a first processor.

11. The device of claim 10, wherein the first processing thread is one of a plurality of processing threads executing in parallel on a plurality of processors including the first processor.

12. The device of claim 11, wherein a total number of partitions in the memory, including the first partition, is greater than a total number of the plurality of processing threads.

13. The device of claim 10, wherein a flow of packets including the first data packet is assigned to the first processing thread.

14. The device of claim 13, wherein the flow of packets comprises a plurality of data packets including the first data packet, and all data packets in the plurality of data packets share a common flow key that is identical to the first flow key.

15. The device of claim 9, wherein the operations further comprise:
   extracting a second flow key from a second data packet, wherein the second flow key comprises a 5-tuple extracted from a header of the second data packet, wherein the 5-tuple extracted from the header of the second data packet comprises:
      a source internet protocol address of the second data packet;
      a destination internet protocol address of the second data packet;
      a source port number of the second data packet;
      a destination port number of the second data packet; and
      a type of service associated with the second data packet;
   inputting the second flow key into the hash function to obtain a second output value that is different from the first output value;
   selecting a second partition in the memory to which to store the second data packet, wherein the second partition is selected based on the second output value; and
   storing the second data packet to the second partition.

16. The device of claim 9, wherein the device is an intelligent network interface card of a host computing system.

17. An apparatus comprising:
   a first network interface card, wherein the first network interface card is configured to identify, by applying a hash function to a first flow key extracted from a first data packet, a first flow of packets of a plurality of flows of packets to which the first data packet belongs, wherein the first flow key comprises a 5-tuple extracted from a header of the first data packet, wherein the 5-tuple extracted from the header of the first data packet comprises:
      a source internet protocol address of the first data packet;
      a destination internet protocol address of the first data packet;
      a source port number of the first data packet;
      a destination port number of the first data packet; and
      a type of service associated with the first data packet;
   a second network interface card, wherein the second network interface card is configured to identify, by applying the hash function to a second flow key extracted from a second data packet, a second flow of packets of the plurality of flows of packets to which the second data packet belongs, wherein the second flow key comprises a 5-tuple extracted from a header of the second data packet, wherein the 5-tuple extracted from the header of the second data packet comprises:
      a source internet protocol address of the second data packet;
      a destination internet protocol address of the second data packet;
      a source port number of the second data packet;
      a destination port number of the second data packet; and
      a type of service associated with the second data packet;
   a memory distinct from the first network interface card and the second network interface card, wherein a first partition of the memory is assigned to the first flow of packets and a second partition of the memory is assigned to the second flow of packets; and
   a plurality of processors configured to execute a plurality of threads including a first thread and a second thread, wherein the first thread is programmed to retrieve data packets from the first partition and the second thread is programmed to retrieve data packets from the second partition.

18. The apparatus of claim 17, wherein the plurality of threads is configured to execute in parallel on the plurality of processors.

19. The apparatus of claim 18, wherein a total number of partitions in the memory, including the first partition and the second partition, is greater than a total number of the plurality of threads.

20. The apparatus of claim 17, wherein the first flow of packets comprises a plurality of data packets including the first data packet, and all data packets in the plurality of data packets of the first flow of packets share a common flow key that is identical to the first flow key.

* * * * *